United States Patent [19]

Hester, Jr.

[11] 3,867,530

[45] Feb. 18, 1975

[54] 2-(3-AMINOPROPYL)-2,4-DIHYDRO-6-PHENYL-1H-S-TRIAZOLO[4,3-A][1,4]BENZODIAZEPIN-1-ONES AND METHOD OF TREATMENT THEREWITH

[75] Inventor: Jackson B. Hester, Jr., Galesburg, Mich.

[73] Assignee: The Upjohn Company, Kalamazoo, Mich.

[22] Filed: Aug. 14, 1972

[21] Appl. No.: 280,158

[52] U.S. Cl.................. 424/248, 424/250, 424/267, 424/269
[51] Int. Cl............................................ A61k 27/00
[58] Field of Search........... 424/248, 250, 244, 273, 424/267, 269; 260/308 E, 293.59, 260/247.2 A, 208

[56] References Cited
UNITED STATES PATENTS

| | | | |
|---|---|---|---|
| 3,201,404 | 8/1965 | Ruschig et al. | 260/308 C |
| 3,514,466 | 5/1970 | Stähle et al. | 260/308 C |
| 3,644,334 | 2/1972 | Ning et al. | 260/239.30 |
| 3,646,055 | 2/1972 | Hester | 260/308 C |

FOREIGN PATENTS OR APPLICATIONS 771,756  12/1971  Belgium

Primary Examiner—Stanley J. Friedman
Attorney, Agent, or Firm—John J. Killinger; Roman Saliwanchik

[57] ABSTRACT

Therapeutic compositions for treating humans and animals comprising, in dosage unit form, a 2-(3-aminopropyl)-2,4-dihydro-6-phenyl-1H-s-triazolo[4,3-a][1,4]benzodiazepin-1-one of the Formula 1:

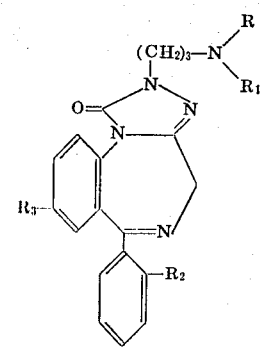

Formula I wherein R and $R_1$ are selected from the group consisting of hydrogen and alkyl of one to three carbon atoms, inclusive, or the group

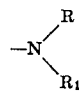

is a heterocyclic ring selected from the group consisting of pyrrolidino, piperidino, morpholino, piperazino, 4-methylpiperazino, 4-(2-hydroxyethyl)piperazino, and 4-phenylpiperazino; wherein $R_2$ is selected from the group consisting of fluorine, chlorine, and bromine and wherein $R_3$ is selected from the group consisting of fluorine, chlorine, bromine, nitro, and trifluoromethyl, including the pharmacologically acceptable acid addition salts thereof in combination with a pharmaceutical carrier. The compositions are useful as psychic energizers and antidepressants for treatment of depressed and anxious states.

The compositions can be administered to human or animal subjects.

9 Claims, No Drawings

2-(3-AMINOPROPYL)-2,4-DIHYDRO-6-PHENYL-1H-S-TRIAZOLO[4,3-A][1,4]BENZODIAZEPIN-1-ONES AND METHOD OF TREATMENT THEREWITH

CROSS REFERENCE TO RELATED APPLICATIONS

The active compounds of the present invention and their preparation are disclosed in copending U.S. application Ser. No. 204,680, filed Dec. 3, 1971.

BRIEF SUMMARY OF THE INVENTION

This invention is a therapeutic composition for treating humans and animals comprising a benzodiazepine of the Formula I and including the pharmacologically acceptable acid addition salts thereof in combination with a pharmaceutical carrier and a method for treating depression and anxiety.

DETAILED DESCRIPTION OF THE INVENTION

The compounds of the Formula I can be prepared by methods disclosed in copending application Ser. No. 204,680, filed Dec. 3, 1971.

The compositions of the present invention are presented for administration to humans and animals in unit dosage forms, such as tablets, capsules, pills, powders, granules, sterile parenteral solutions or suspensions, and oral solutions or suspensions, and oil-in-water and water-in-oil emulsions containing suitable quantities of the compound of Formula I.

For oral administration either solid or fluid unit dosage forms can be prepared. For preparing solid compositions such as tablets, the compound of Formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Wafers are prepared in the same manner as tablets, differing only in shape and the inclusion of sucrose or other sweetener and flavor. In their simplest embodiment, capsules, like tablets, are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with a syrup vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The term unit dosage form, as used in the specification and claims, refers to physically discrete units suitable as unitary dosages for human subjects and animals, each unit containing a predetermined quantity of active material calculated to produce the desired therapeutic effect in association with the required pharmaceutical diluent, carrier, or vehicle. The specifications for the novel unit dosage forms of this invention are dictated by and directly dependent on (a) the unique characteristics of the active material and the particular effect to be achieved, and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonsful, tablespoonsful, droppersful, ampules, vials, segregated multiples of any of the foregoing, and other forms as herein described.

The dosage of the compound for treatment depends on route of administration, the age, weight, and condition of the patient. A dosage schedule of from about 5 to 300 mg. in a single dose, embraces the effective range to alleviate depression for which the compositions are effective. The dosage to be administered is calculated on the basis of from about 0.07 to about 4.5 mg./kg. by weight of subject.

The compound is compounded with a suitable pharmaceutical carrier in unit dosage form for convenient and effective administration. In the preferred embodiments of this invention, the dosage units contain the compound in: 5, 10, 25, 100, and 250 mg. amounts for systemic treatment, and 0.1% to 5.0% w/v for parenteral treatment. The dosage of compositions containing a compound of Formula I and one or more other active ingredients is to be determined with reference to the actual dosage of each such ingredient.

In addition to the administration of a compound of Formula I as the principle active ingredient of compositions for treatment of the conditions described herein, the said compound can be combined with other compounds to obtain advantageous combinations of properties.

The following examples are illustrative of the best mode contemplated by the inventor for carrying out his invention and are not to be construed as limiting.

EXAMPLE 1

A lot of 10,000 tablets, each containing 5.0 mg. of 8-chloro-6-(o-chlorophenyl)-2-[3-(dimethylamino)propyl]-2,4-dihydro-1H-s-triazolo[4,3-a][1,4]benzodiazepin-1-one is prepared from the following types and amounts of ingredients:

| | |
|---|---|
| 8-chloro-6-(o-chlorophenyl)-2-[3-(dimethylamino)propyl]-2,4-dihydro-1H-s-triazolo[4,3-a][1,4]benzodiazepin-1-one | 50 gm. |
| Dicalcium phosphate | 1,500 gm. |
| Methylcellulose, U.S.P. (15 cps.) | 60 gm. |
| Talc | 150 gm. |
| Corn Starch | 200 gm. |
| Magnesium stearate | 12 gm. |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in reducing depression and anxiety in adults at a dose of one to two tablets, depending on the age and weight of the patient.

EXAMPLE 2

One thousand two-piece hard gelatin capsules, each containing 100 mg. of 8-chloro-6-(o-chlorophenyl)-2-[3-(dimethylamino)propyl]-2,4-dihydro-1H-s-triazolo[4,3-a][1,4]-benzodiazepin-1-one hydrobromide are prepared from the following types and amounts of ingredients:

| | |
|---|---|
| 8-chloro-6-(o-chlorophenyl)-2-[3-(dimethylamino)propyl]-2,4-dihydro-1H-s-triazolo[4,3-a][1,4]benzodiazepin-1-one hydrobromide | 100 gm. |
| Talc | 25 gm. |
| Magnesium stearate | 250 gm. |

The ingredients are mixed well and filled into capsules of the proper size.

Capsules so prepared are useful for treating depression and anxiety in adults at a dose of one capsule.

EXAMPLE 3

One thousand tablets for sublingual use are prepared from the following ingredients:

| | |
|---|---|
| 8-chloro-6-(o-chlorophenyl)-2-[3-(dimethylamino)propyl]-2,4-dihydro-1H-s-triazolo[4,3-a][1,4]benzodiazepin-1-one | 5 gm. |
| Polyethylene glycol 4,000, powdered | 150 gm. |
| Polyethylene glycol 6,000, powdered | 75 gm. |

The ingredients are mixed well and compressed into sublingual-type tablets weighing 226 mg.

These tablets placed under the tongue are useful to reduce depression and anxiety with a rapid induction at a dose of one tablet.

EXAMPLE 4

Soft gelatin capsules for oral use, each containing 10 mg. of 8-chloro-6-(o-chlorophenyl)-2-[3-(dimethylamino)propyl]-2,4-dihydro-1H-s-triazolo[4,3-a][1,4]benzodiazepin-1-one are prepared by first dispersing the micronized compound in corn oil to render the material capsulatable and then encapsulating in the usual manner.

EXAMPLE 5

One thousand tablets, each containing 25 mg. of 8-chloro-6-(o-chlorophenyl)-2-[3-(dimethylamino)propyl]-2,4-dihydro-1H-s-triazolo[4,3-a][1,4]benzodiazepin-1-one are made from the following types and amounts of ingredients:

| | |
|---|---|
| 8-chloro-6-(o-chlorophenyl)-2-[3-(dimethylamino)propyl]-2,4-dihydro-1H-s-triazolo[4,3-a][1,4]benzodiazepin-1-one | 25 gm. |
| Lactose | 355 gm. |
| Microcrystalline cellulose NF | 120 gm. |
| Starch | 16 gm. |
| Magnesium stearate powder | 4 gm. |

The ingredients are screened and blended together and pressed into tablets.

The tablets are useful to overcome depression and anxiety.

EXAMPLE 6

A sterile preparation suitable for intramuscular injection and containing 5 mg. of 8-chloro-6-(o-chlorophenyl)-2-[3-(dimethylamino)propyl]-2,4-dihydro-1H-s-triazolo[4,3-a]-[1,4]benzodiazepin-1-one in each milliliter is prepared from the following ingredients:

| | |
|---|---|
| 8-chloro-6-(o-chlorophenyl)-2-[3-(dimethylamino)propyl]-2,4-dihydro-1H-s-triazolo[4,3-a][1,4]benzodiazepin-1-one | 5 gm. |
| Benzyl benzoate | 200 ml. |
| Methylparaben | 1.5 gm. |
| Propylparaben | 0.5 gm. |
| Cottonseed oil q.s. | 1,000 ml. |

One milliliter of this sterile preparation is injected to reduce depression and anxiety in adults.

EXAMPLE 7

Following the procedure of the preceding Examples 1 through 6, inclusive, unit dosage forms are similarly prepared substituting an equal amount each of 8-chloro-6-(o-chlorophenyl)-2-[3-(diethylamino)propyl]-2,4-dihydro-1H-s-triazolo[4,3-a][1,4]benzodiazepin-1-one; 8-chloro-6-(o-chlorophenyl)-2-[3-(pyrrolidino)propyl]-2,4-dihydro-1H-s-triazolo[4,3-a][1,4]benzodiazepin-1-one; 8-chloro-6-(o-chlorophenyl)-2-[3-(piperidino)propyl]-2,4-dihydro-1H-s-trizolo[4,3-a][1,4]benzodiazepin-1-one; 8-chloro-6-(o-chlorophenyl)-2-[3-(morpholino)propyl]-2,4-dihydro-1H-s-triazolo[4,3-a][1,4]benzodiazepin-1-one; 8-chloro-6-(o-chlorophenyl)-2-[3-(piperazino)propyl]-2,4-dihydro-1H-s-triazolo[4,3-a][1,4]benzodiazepin-1-one; 8-chloro-6-(o-chlorophenyl)-2-[3-(4-methylipiperazino)propyl]-2,4-dihydro-1H-s-triazolo[4,3-a][1,4]benzodiazepin-1-one; and 8-chloro-6-(o-chlorophenyl)-2-[3-(methylamino)propyl]-2,4-dihydro-1H-s-triazolo[4,3-a][1,4]benzodiazepin-1-one for the 8-chloro-6-(o-chlorophenyl)-2-[3-(dimethylamino)propyl]-2,4-dihydro-1H-s-triazolo[4,3-a][1,4-benzodiazepin-1-one.

I claim:

1. A process for treating depression and anxiety comprising the administration to a depressed or anxietar human or animal subject of from about 5 to about 300 mg. of a compound of the formula:

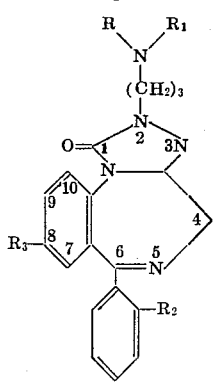

Formula I wherein R and $R_1$ are selected from the group consisting of hydrogen and alkyl of one to three carbon atoms, inclusive; or the group

is a heterocyclic ring selected from the group consisting of pyrrolidino, piperidino, morpholino, piperazino, 4-methylpiperazino, 4-(2-hydroxyethyl)piperazino, and 4-phenylpiperazino; wherein $R_2$ is selected from the group consisting of fluorine, chlorine, and bromine and wherein $R_3$ is selected from the group consisting of fluorine, chlorine, bromine, nitro, and trifluoromethyl, or a pharmacologically acceptable acid addition salt thereof in association with a pharmaceutical carrier.

2. The process of claim 1 wherein the compound is 8-chloro-6-(o-chlorophenyl)-2-[3-(dimethylamino)propyl]-2,4-dihydro-1H-s-triazolo[4,3-][1,4]benzodiazepin-1-one and the amount administered is from about 5 to about 300 mg.

3. The process of claim 1 wherein the compound is 8-chloro-6-(o-chlorophenyl)-2-[3-(diethylamino))propyl]-2,4-dihydro-1H-s-triazolo[4,3-a][1,4]benzodiazepin-1-one and the amount administered is from about 5 to about 300 mg.

4. The process of claim 1 wherein the compound is 8-chloro-6-(o-chlorophenyl)-2-[3-(pyrrolidino)propyl]-2,4-dihydro-1H-s-triazolo[4,3-a][1,4]benzodiazepin-1-one and the amount administered is from about 5 to about 300 mg.

5. The process of claim 1 wherein the compound is 8-chloro-6-(o-chlorophenyl)-2-[3-(piperidino)propyl]-2,4-dihydro-1H-s-triazolo[4,3-a][1,4]benzodiazepin-1-one and the amount administered is from about 5 to about 300 mg.

6. The process of claim 1 wherein the compound is 8-chloro-6-(o-chlorophenyl)-2-[3-(morpholino)propyl]-2,4-dihydro-1H-s-triazolo[4,3-a][1,4]benzodiazepin-1-one and the amount administered is from about 5 to about 300 mg.

7. The process of claim 1 wherein the compound is 8-chloro-6-(o-chlorophenyl)-2-[3-(piperazino)propyl]-2,4-dihydro-1H-s-triazolo[4,3-a][1,4]benzodiazepin-1-one and the amount administered is from about 5 to about 300 mg.

8. The process of claim 1 wherein the compound is 8-chloro-6-(o-chlorophenyl)-2-[3-(4-methylpiperazino)propyl]-2,4-dihydro-1H-s-triazolo[4,3-a][1,4]benzodiazepin-1-one and the amount administered is from about 5 to about 300 mg.

9. The process of claim 1 wherein the compound is 8-chloro-6-(o-chlorophenyl)-2-[3-(methylamino)propyl]-2,4-dihydro-1H-s-triazolo[4,3-a][1,4]benzodiazepin-1-one and the amount administered is from about 5 to about 300 mg.

* * * * *